Jan. 16, 1968     H. L. DRYDEN, DEPUTY     3,364,366
ADMINISTRATOR OF THE NATIONAL AERONAUTICS
AND SPACE ADMINISTRATION
MULTIPLE SLOPE SWEEP GENERATOR
Filed Aug. 26, 1965
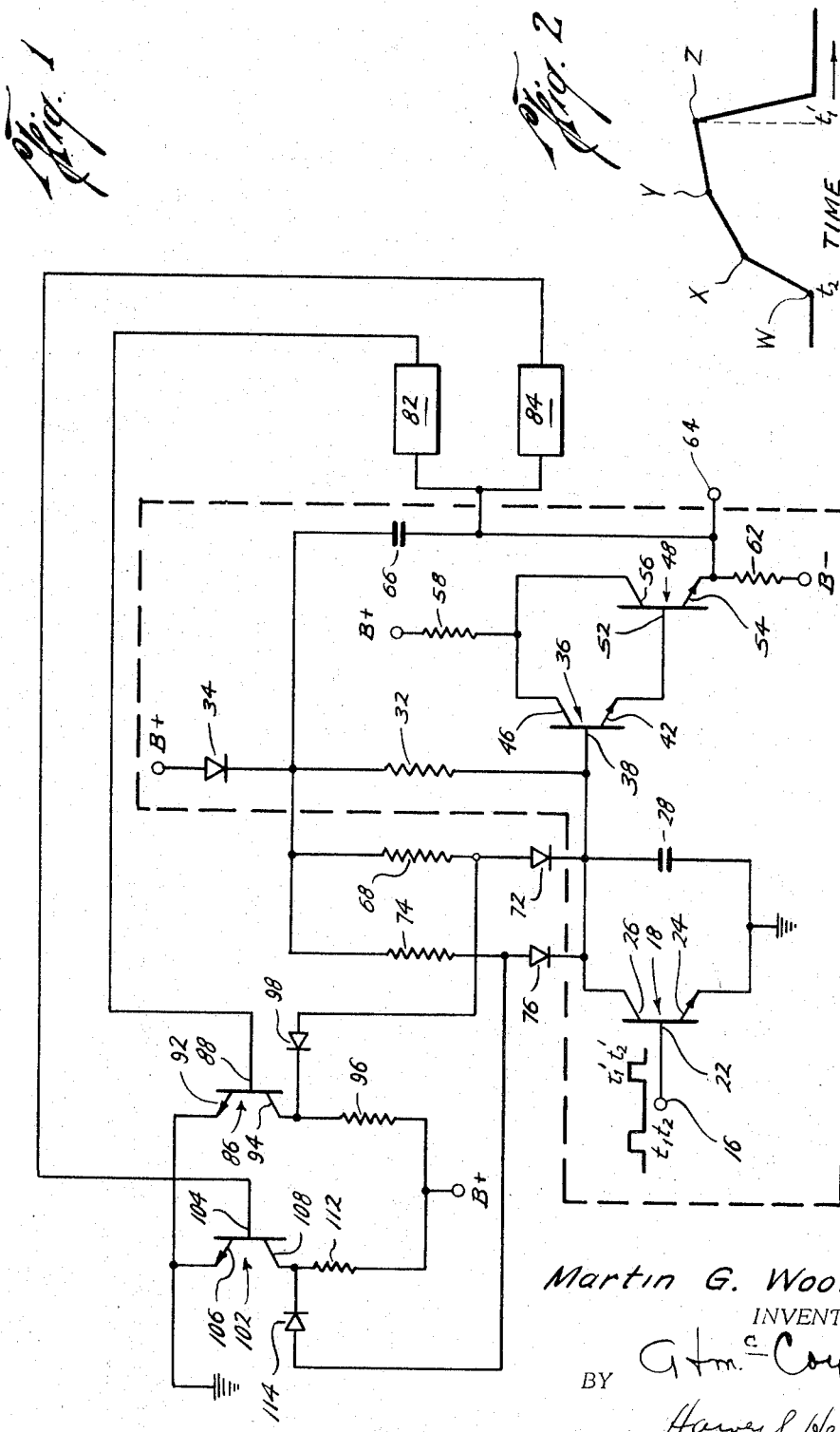
Martin G. Woolfson
INVENTOR.
BY
ATTORNEYS

United States Patent Office 3,364,366
Patented Jan. 16, 1968

3,364,366
MULTIPLE SLOPE SWEEP GENERATOR
Hugh L. Dryden, Deputy Administrator of the National Aeronautics and Space Administration, with respect to an invention of Martin G. Woolfson, Baltimore, Md.
Filed Aug. 26, 1965, Ser. No. 482,952
3 Claims. (Cl. 307—263)

ABSTRACT OF THE DISCLOSURE

The invention comprises a transistorized bootstrap sweep circuit having a capacitor which is charged linearly from a constant current source containing a first resistor. The constant current source also comprises a plurality of charging paths connected in parallel with the first resistor, each path having a charging resistor and diode connected in series. The charging resistors are connected between a feedback capacitor and a diode through the charging capacitor. A plurality of threshold circuits are connected between the output terminal of the bootstrap circuit and a switching transistor. The collectors of each switching transistor are connected through a steering diode to the junction of the charging resistor and a diode. As the voltage across the charging capacitor, which also appears at the circuit output terminal, reaches a predetermined value, a threshold circuit set for the predetermined value causes its associated switching transistor to become conductive. As the output voltage continues to rise, the successive threshold circuits operate to again change the slope of the output voltage.

The invention described herein was made in the performance of work under a NASA contract and is subject to the provision of Section 305 of the National Aeronautics and Space Act of 1958, Public Law 85-568 (72 Stat. 435); U.S.C. 2457.

---

This invention relates in general to electrical sweep voltage generators and, more particularly, to a circuit for producing a multiple slope voltage sweep.

In linear sawtooth voltage generators, a satisfactory technique of producing the sawtooth voltage is to charge a capacitor from a constant current source. One circuit for obtaining a constant current source uses a feedback circuit commonly called a "bootstrap sweep circuit." In one such bootstrap sweep circuit the constant current source is obtained by using a capacitor in the feedback path. The sawtooth voltage produced by this circuit is relatively linear.

When the slope of the sawtooth voltage to be generated is to have a multiple slope, a prior art technique for obtaining the multiple slope has been to use a second charging capacitor adapted to be switched into shunt relationship with a first charging capacitor to provide a decreased slope in the amplitude-time charging characteristics of the charging network. However, such a circuit requires complex switching apparatus in order to switch the second capacitor in shunt with the first capacitor at the desired time of the change of the slope. Further, the resultant slope change is not sufficiently abrupt for certain applications. Moreover, should it be desired to have more than two slopes in the sweep voltage, the multitude of various parameters required to be added to the circuit causes undue complexity and greatly affects the linearity of the sweep voltage.

In order to overcome the prior art disadvantages of conventional multiple slope sweep circuits, the present invention provides a simple, yet efficient manner of changing and adjusting the slope of a sweep voltage. By using electronic switching to change the R-C time constant of the charging circuit, the slope of the output voltage is abruptly changed so as to produce the desired multiple slope sweep voltage.

More particularly, the sweep generator of this invention comprises a conventional transistorized bootstrap sweep circuit having a capacitor which is charged linearly from a constant current source containing a first resistor. The constant current source also comprises a plurality of charging paths connected in parallel with the first resistor, each path having a charging resistor and diode connected in series. The charging resistors are all connected at one end to the feedback capacitor of the bootstrap circuit. The other ends of the charging resistors are connected to the anode of the diode, the cathodes of which are connected to the charging capacitor. A plurality of threshold circuits, each being associated with one of the charging paths and one of a plurality of switching transistors, are connected between the output terminal of the bootstrap circuit and the base of its associated switching transistor. The collectors of each switching transistor are connected through a steering diode to the junction of the charging resistor and diode of its associated charging path. As the voltage across the charging capacitor, which also appears at the circuit output terminal, reaches a predetermined value, a threshold circuit set for the predetermined value causes its associated switching transistor to become conductive, thus causing the charging current through its associated charging path to be shunted through the switching transistor to ground. Thus the charging resistor is effectively removed from the charging path and the slope of the output voltage changes. As the output voltage continues to rise, the successive threshold circuits operate to again change the slope of the output voltage.

The advantage of this invention, both as to its construction and mode of operation, will be readily appreciated as the same becomes better understood by reference to the following detailed description when considered in connection with the accompanying drawings in which like reference numerals designate like parts throughout the figures, and wherein:

FIG. 1 is a circuit diagram of a preferred embodiment of the present invention; and FIG. 2 is an illustrative waveform of the output voltage of the embodiment of FIG. 1.

Referring now to the drawings, there is shown in FIG. 1, within the dotted lines, a conventional bootstrap sweep circuit. A source of positive pulses are applied to an input terminal 16 which is connected to a transistor 18 at its base 22. The transistor 18 comprises an emitter 24 which is connected to ground and a collector 26 which is connected to one side of a charging capacitor 28, the other side of which is connected to ground. A charging resistor 32 is connected on one side to the collector 26 and on the other side to a source of positive potential (B+) through a diode 34.

A first output transistor 36, having a base 38, emitter 42, and collector 46, is connected at its base terminal to the collector 26. A second output transistor 48, having a base 52, emitter 54, and collector 56, is connected at its base terminal to emitter 42. Collectors 46, 56 are connected to a source of positive potential (B+) through a biasing resistor 58. Emitter 54 is connected through a biasing resistor 62 to a source of negative potential (B−) and is also connected to an output signal terminal 64. Output signals at the terminal 64 are fed back to the junction of the charging resistor 32 and diode 34 through a feedback capacitor 66.

The basic elements so far described may be considered a conventional bootstrap circuit providing a near linear sweep voltage at the output terminal 64.

In accordance with the invention, there is added to the conventional bootstrap circuit, elements for changing the charge rate of capacitor 28. Connected in parallel across charging resistor 32 is a second charging path comprising resistor 68 and diode 72. Additionally, a second parallel charging path, comprising a resistor 74 and a diode 76 is connected in parallel across resistor 32.

Output signals at terminal 64 are further fed to a pair of threshold trigger circuits 82, 84. Output signals from threshold circuit 82 are coupled to a first switching transistor 86 at its base 88. Transistor 86 further comprises an emitter 92 which is connected to ground and a collector 94 which is connected to a source of positive potential (B+) through a biasing resistor 96. Further, a diode 98 is connected at its cathode to the collector 94 and at its anode to the junction of resistor 68 and the anode of diode 72. The output of the threshold circuit 84 is connected to a transistor 102 at its base 104. The transistor 102 further comprises an emitter 106 which is connected to ground and a collector 108 which is connected to the source of positive potential (B+) through a biasing resistor 112. Further, a diode 114 is connected at its cathode to the collector 108 and at its anode to the junction of resistor 74 and the anode of diode 76.

With the foregoing in mind, operation of the device of the circuit in FIG. 1 will be explained hereinafter with reference to the waveform of FIG. 2. At time $t_1$ when a positive pulse is applied to the terminal 16, transistor 18 is rendered conductive thereby causing capacitor 28 to discharge. At time $t_2$ when the transistor is again rendered nonconductive, the capacitor 28 begins to charge through the parallel combination of resistors 32, 68, and 74 towards a value approaching B+. The voltage across the capacitor 28 is equal to the voltage at terminal 64 minus the small voltage drop across emitter-follower transistors 36 and 48. This output voltage at time $t_2$ is normally negligible, as shown at point w, and the voltage rises linearly to point X as the capacitor 28 starts to charge.

The output voltage appearing at terminal 64 is also fed back to the junction of diode 34 and resistors 32, 68, and 74, providing a substantially constant voltage across resistors 32, 68, and 74, and providing a substantially constant charging current for capacitor 28.

The voltage at terminal 64 is also connected to threshold circuits 82 and 84. The threshold circuit 82 is arranged so that when the output voltage at terminal 64 reaches a value in magnitude depicted as point X on the curve of FIG. 2, a positive pulse is fed to the base 88 of transistor 86 rendering the transistor conductive and causes the charging current produced by resistor 68 to be shunted to ground. Thus the charging current is fed to the capacitor 28 only through resistors 32 and 74 and as shown on the curve of FIG. 2 the slope of sweep voltage at point X changes. When the output voltage reaches a magnitude depicted by point Y on the curve of FIG. 2, the threshold circuit 84 produces a positive pulse at the base 104 rendering the transistor 102 conductive, and allowing the charging current through resistor 74 to be shunted to ground. Thus at point Y the slope of the output voltage once again changes. When a positive pulse is once again applied to the base 22 of transistor 18 at time $t'_1$, when the output voltage is at point Z, the capacitor 28 is discharged and a new sweep cycle occurs.

As can be readily seen, resistors 32, 68, and 74 may be made adjustable so that the RC time constant of the charging circuit can be varied. Further, the threshold devices 82 and 84 can be made adjustable so as to vary the voltage level when it is desired to disconnect one of the charging resistors from the charging path. Moreover, additional charging resistors may be connected in parallel so as to provide as many slope changes as are needed.

The threshold trigger circuits 82 and 84 may be conventional Schmitt trigger circuits so as to provide an abrupt transition from one slope change to the next. The trigger circuit threshold value is normally readily adjustable and can provide a sharp pulse delayed in time from $t_2$ to times corresponding to point X or Y and terminate essentially at the beginning of the next positive pulse at terminal 16. However, if an extremely abrupt transition is not required, a simple diode comparator circuit can be employed in the circuits 82 and 84.

Transistors 36, 48 provide a high impedance to capacitor 28 so as to prevent leakage of the capacitor 28. While the output stage has been depicted as a multiple emitter-follower configuration, other configurations such as triple emitter-follower or a combination of a field effect and conventional transistor may be employed.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A multiple slope voltage wave generator comprising:
 (A) a first transistor having a base, emitter, and collector;
 (B) a signal terminal connected to the base of said first transistor;
 (C) a charging capacitor connected between the emitter and the collector of said first transistor;
 (D) a high impedance circuit having an input terminal and an output terminal, said input terminal being coupled to said charging capacitor;
 (E) a current source for charging said capacitor with a constant current comprising a plurality of parallel connected paths, said paths containing a resistor and a diode having an anode and cathode, each of said resistors being connected between said high impedance circuit output terminal through a feedback capacitor and the anode of said diodes, the cathodes of said diodes being connected to said charging capacitor;
 (F) means for altering the slope of said voltage at a predetermined magnitude of the voltage at said output terminal comprising:
  (1) a plurality of threshold circuits, each having an input terminal and an output terminal;
  (2) means coupling said high impedance output terminal to said threshold circuit input terminals;
  (3) a steering diode associated with each of said parallel connected paths;
  (4) a plurality of switching transistors, each having a base, an emitter, and a collector, each switching transistor being associated with one of said threshold circuits, the output terminal of each of said threshold circuits being coupled to its associated switching transistor base, each of said switching transistor collectors being coupled through one of said steering diodes to one of said parallel connected charging paths at the junction of said resistor and the anode of said diode; and
  (5) a source of reference potential, each of said switching transistor emitters being connected to said source of reference potential.

2. A multiple slope voltage wave generator comprising:
 a first transistor having a base, emitter, and collector;
 a signal terminal connected to the base of said first transistor;
 a charging capacitor connected between the emitter and the collector of said first transistor;
 a high impedance circuit having an input terminal and an output terminal, said input terminal being coupled to said charging capacitor;
 a constant current source for charging said capacitor comprising a plurality of parallel connected paths, each path containing a resistor, said resistors being coupled between said charging capacitor and said output terminal of said high impedance circuit through a feedback capacitor; and means for disconnecting at least a first of said resistors from said current source so as to alter the slope of said voltage at a predetermined magnitude of the voltage at said output terminal comprising;
 (1) a threshold circuit having an input terminal and an output terminal;
 (2) means coupling said high impedance output terminal to said threshold circuit input terminal; and
 (3) a switching transistor having a base, emitter, and collector, said threshold circuit output terminal being coupled to said switching transistor base, said switching transistor collector being coupled to said resistor, and said switching transistor emitter being coupled to ground.

3. A multiple slope voltage wave generator comprising:
 a first transistor having a base, emitter, and collector;
 a signal terminal connected to the base of said first transistor;
 a charging capacitor connected between the emitter and the collector of said first transistor;
 a high impedance circuit having an input terminal and an output terminal, said input terminal being coupled to said charging capacitor;
 a constant current source for charging said capacitor comprising a plurality of parallel connected paths, each path containing a resistor, said resistors being coupled between said charging capacitor and said output terminal of said high impedance circuit through a feedback capacitor; and means for disconnecting at least a first of said resistors from said current source so as to alter the slope of said voltage at a predetermined magnitude of the voltage at said output terminal comprising:
 (1) a threshold circuit having an input terminal and an output terminal;
 (2) means coupling said high impedance output terminal to said threshold circuit input terminal; and
 (3) a switching transistor coupled to said threshold circuit output terminal and one of said resistors.

References Cited

UNITED STATES PATENTS 2,928,003   3/1960   Etter _____ 328—176 XR

JOHN S. HEYMAN, *Primary Examiner.*

ARTHUR GAUSS, *Examiner.*

J. ZAZWORSKY, *Assistant Examiner.*